June 19, 1945.　　　　J. A. PAUL　　　　2,378,725
FASTENER DRIVING MACHINE
Filed April 14, 1944　　　2 Sheets-Sheet 2
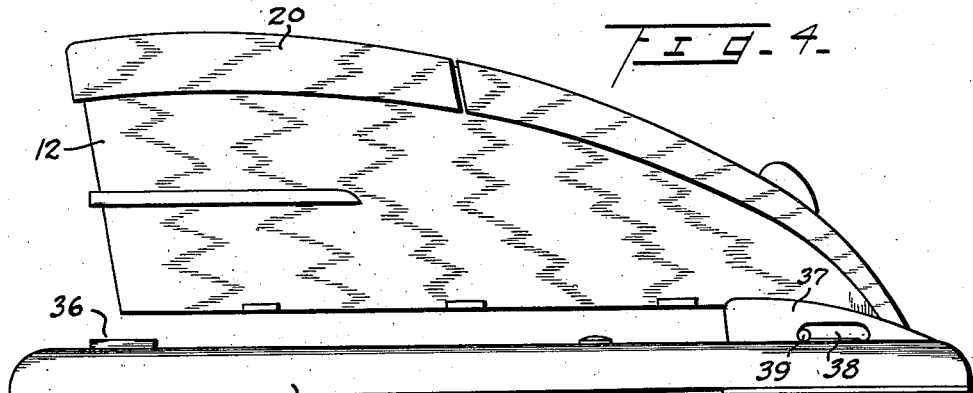
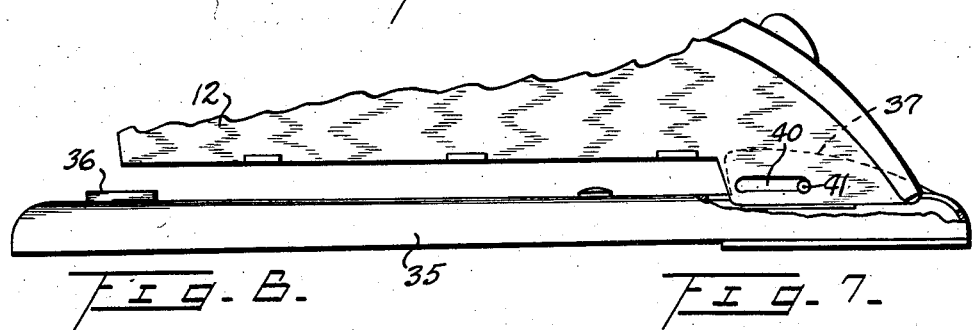
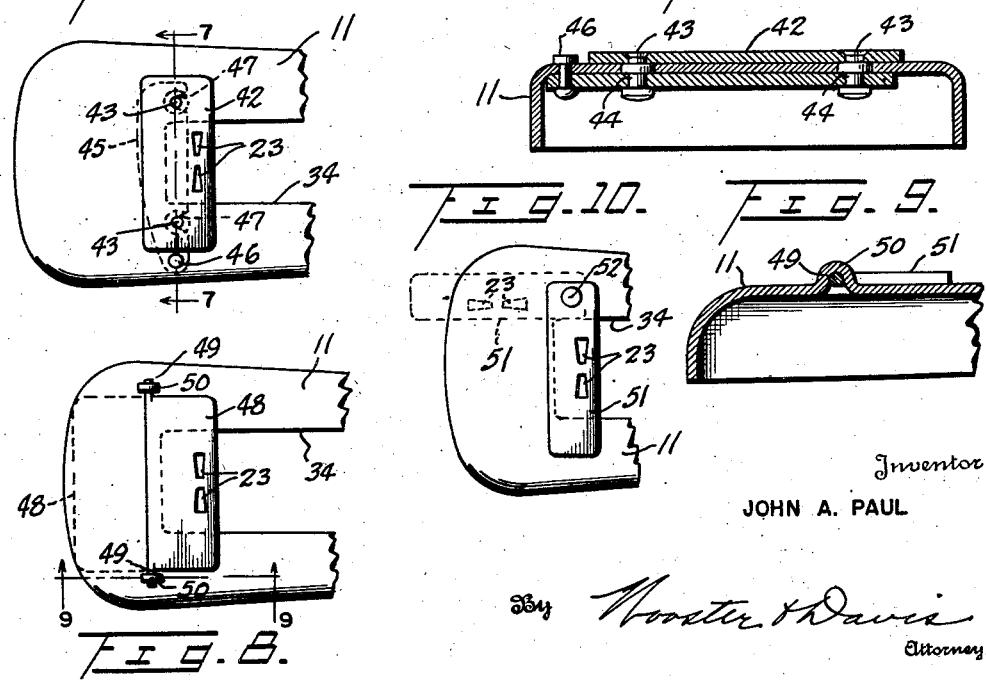
Inventor
JOHN A. PAUL Patented June 19, 1945

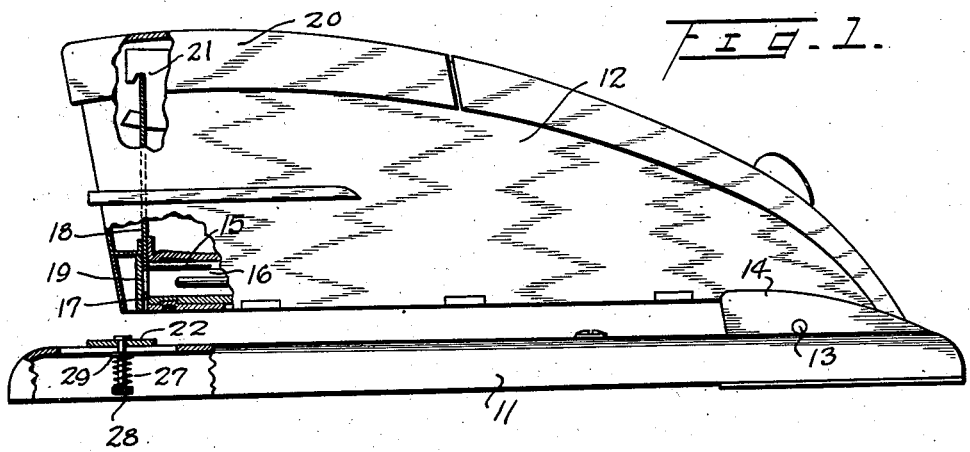
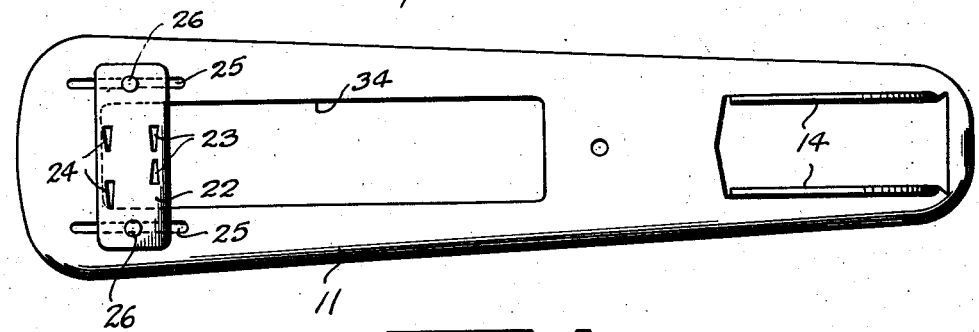
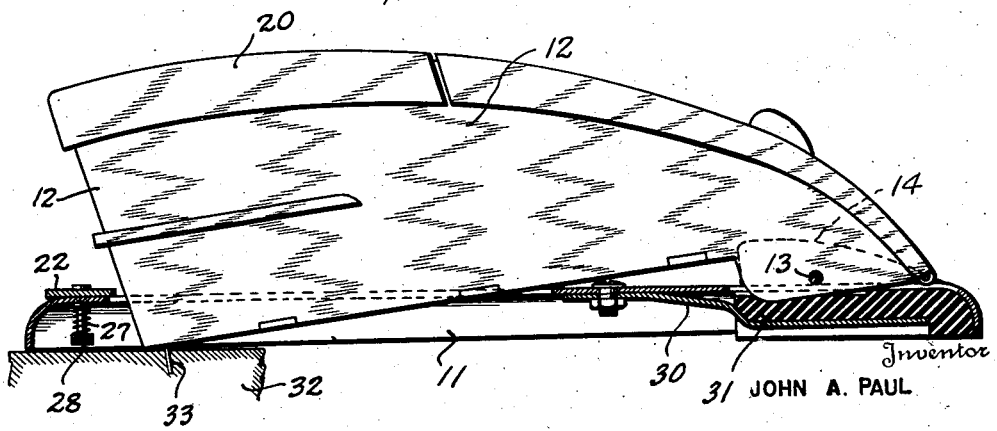

2,378,725

UNITED STATES PATENT OFFICE 2,378,725

FASTENER DRIVING MACHINE

John A. Paul, Norwalk, Conn., assignor to The E. H. Hotchkiss Company, Norwalk, Conn., a corporation of Connecticut Application April 14, 1944, Serial No. 531,074

9 Claims. (Cl. 1—3)

This invention relates to fastener driving machines, more particularly to the type of machine for driving substantially U-shaped staples or fasteners, and has for an object to provide a construction and arrangement whereby the same machine may be used for driving the fastener or staples as a so-called "stapler" in which the prongs of the fastener or staple are bent over and clinched as the fastener is driven, or it may be used as a so-called "tacker" in which the prongs of the staple are driven into a work member without clinching.

It is also an object of the invention to provide a construction and arrangement whereby through a simple operation the device may be adapted for use either as a stapler or a tacker.

With the foregoing and other objects in view I have devised the construction illustrated in the accompanying drawings forming a part of this specification. It is, however, to be understood the invention is not limited to the specific construction and arrangement shown but may embody various changes and modifications within the scope of the invention.

In these drawings:

Fig. 1 is a side elevation of one form of the device, parts being broken away to more clearly show the construction and showing the parts in position for the device to be used as a so-called stapler;

Fig. 2 is a top plan view of the base portion of the device of Fig. 1 with the housing removed;

Fig. 3 is a side elevation of the housing and a section of the base showing the parts in position for use as a so-called tacker;

Fig. 4 is a side elevation showing a modified construction;

Fig. 5 is a similar view showing a further modification but with the parts broken away;

Fig. 6 is a top plan view of the forward end portion of the base showing another modified arrangement;

Fig. 7 is a section substantially on the line 7—7 of Fig. 6 and on an enlarged scale;

Fig. 8 is a top plan view of the forward end of the base showing another modification;

Fig. 9 is a detail section on an enlarged scale taken substantially on line 9—9 of Fig. 8, and Fig. 10 is a top plan view of the forward end portion of the base member showing still another modification.

Referring first to Figs. 1, 2 and 3, the device comprises a base member 11 and a housing 12 mounted on the base member by any suitable means such as a pivot pin 13 passing through upstanding lugs 14 struck up from the base. Mounted in the housing 12 is a suitable type of means for driving the fasteners, in the present case substantially U-shaped staples 15 inserted in the machine as strips comprising a plurality of attached staples upon a supporting guide 16 upon which they are advanced by suitable feed mechanism (not shown) in succession to a guideway 17 adjacent the forward end of the device in which there is a vertically reciprocable driver or plunger 18 adapted to drive the forward fastener or staple 19 through the guideway 17 into one or more work pieces placed under the forward end of the housing. The driver or plunger 18 is operated by a suitable means such as a hand operated lever 20 connected to this driver at 21 and normally held in its upper position by a spring means (not shown). By depressing the lever 20 through pressure on the top thereof the driver or plunger 18 forces it downwardly to drive the staple or fastener 19 into the work in a manner well known. This operation may also force the forward end of the housing downwardly so that it rests on top of the work pieces during the fastener driving operation. The housing and driving mechanism shown is substantially that illustrated in the patent to Polzer et al. No. 2,240,911, May 6, 1941, for Staple driving machine.

When the staples or fasteners are driven and the prongs folded over on the under side of the work pieces after being driven through these pieces the machine is operated as what is called a stapler. For the purpose of folding over and clinching the prongs an anvil is mounted in alignment with the staple guideway 17 and cooperates with the driver to clinch the prongs. In the present instance this anvil comprises a plate 22 mounted on the base 11 under the forward end of the housing 12. This anvil is provided with means for folding over and clinching the fastener prongs and in the present instance comprises two sets of recesses 23 and 24. The recesses 23 are arranged to fold the laterally spaced prongs of the substantially U-shaped staple inwardly toward each other to make what is called a permanent fastener, while the recesses 24 are arranged to bend the prongs laterally in the same direction to effect what is known as a temporary fastener. The anvil 22 is so mounted that it may be shifted on the base to bring either set of recesses into alignment with the staple driver in the guideway 17 so as to effect either type of fastening as desired. Various ways may be used for mounting this anvil, but in the arrangement illustrated the base is provided with a pair of elongated slots 25 extending longitudinally thereof and a pin 26 carried by the anvil passes through each slot with a spring 27 on the underside thereof acting between a head 28 and a washer 29 to provide sufficient friction to retain the anvil in different adjusted positions but to permit it to be readily shifted. Indicating means (not shown) may be provided to indicate to the operator when the anvil is in proper position to bring the two sets of recesses into proper stapling position. Resilient means, such for example as spring 30 or rubber 31 may be provided to normally hold the forward end of the housing elevated in the position of Fig. 1.

As above indicated, the device is so constructed and arranged that it may be employed as a so-called tacker in which the lower part of the housing is brought into direct contact with the work, but the prongs of the staple or other fastener are driven into the work without folding or clinching. This is the position shown in Fig. 3 in which the work piece is shown at 32 and the fastener with the unclinched prongs is shown driven into it at 33. To permit this operation the upper wall of the base 11 is provided with an elongated opening 34 of a size and shape to permit the forward end portion of the housing 12 to move down through it into contact with the work piece 32 on which the base may be resting, as shown in Fig. 3. When the device is used as a stapler to clinch the prongs of the fastener, the anvil 22 lies under the forward end portion of the housing and prevents this operation, the anvil operating to support the pieces being stapled and also to support the forward end of the housing. However, the slots 25 in the base are made of sufficient length so that the anvil 22 may be shifted from its clinching position under the housing to permit the housing to pass through the opening 34. It will be seen that in Fig. 2 this anvil while in the clinching position under the forward end of the housing lies over the forward end portion of the opening 34. However, in Fig. 3 it has been shifted forwardly from its position under the housing and therefore the housing is free to move through the opening 34 to the so-called tacking position without interference from the anvil, and as indicated the staple or fastener may then be driven directly into the work without clinching the prongs.

Various means may be employed for permitting relative movement between the housing and the anvil to effect removal of the anvil from the clinching position and permit the housing to move to the tacking position. This may be done either by so mounting the anvil that it may be shifted from the clinching position to free the housing and permit it to move to the tacking position, examples of which are shown in Figs. 1, 2 and 3 and also in Figs. 6 to 10; or the housing may be so connected to the base that it may be shifted relative to the base to carry the forward end away from its position over the anvil, or the base carrying the anvil may be shifted relative to the housing to secure the same result. Examples of the last two arrangements are shown in Figs. 4 and 5.

In Fig. 4 the base 35 corresponding to the base 11 is provided with an elongated opening 34, the same as the base 11, through which the forward end portion of the housing 12 may pass to the tacking position, as shown in Fig. 3. The anvil 36 may be mounted in an immovable position on the base or it could be mounted to be shifted out of position if desired, but the ears 37 are each provided with an elongated slot 38 in which the pin 39 carried by the housing may slide. It will be seen that when this pin is in the forward end of the slot the fastener driving mechanism in the forward end of the housing is over the anvil 36 and the anvil will cooperate therewith clinching the prongs of the staple, but the slots are of such a length that when the pin 39 is in the rear end thereof, which is accomplished by sliding the housing longitudinally, the forward end of the housing is removed from its position over the anvil and it may move downwardly through the opening 34 in the base to the tacking position.

A somewhat similar arrangement is shown in Fig. 5, except that in this case the elongated slot 40 is in the housing 12 and the pivot pin 41 passing through this slot is mounted in the ears 37 of the base. This permits the housing to be shifted to bring the forward end portion thereof carrying the fastener driving means to its position over the anvil 36 to permit this anvil to cooperate with this mechanism to clinch the staples when the pivot pin 41 is in the rear end of the slot, or the housing may be shifted backwardly to bring the pivot pin into the forward end of the slot and carry the forward end of the housing rearwardly from its position over the anvil so that it may pass downwardly through the opening 34 in the base to the tacking position.

In Figs. 6 to 10 are illustrated examples of other means for mounting the anvil so that it may be removed from the stapling or clinching position and permit the housing to move through the opening in the base to the position for use as a tacker.

In Figs. 6 and 7 the anvil 42 with the clinching recesses 23 is provided with studs or pins 43 passing through openings in the top of the base 11. These studs are reduced at 44 at the under side of the top wall of the base to receive a catch member 45 pivoted at 46 to the under side of the top wall of the base. This catch is provided with recesses 47 leading from one side edge thereof adapted to embrace the reduced portion 44 of the studs and thus secure the anvil to the base. By swinging this catch member 45 to the left or counterclockwise as viewed in Fig. 6 the studs are released and the anvil may be removed from the base, which of course removes the anvil from its position over the forward portion of the opening 34 in the base so that the housing 12 may move through this opening to the tacking position of Fig. 3. The anvil in the position of Figs. 6 and 7 brings the recesses 23 in alignment with the fastener driving mechanism in the housing so that it may cooperate therewith to clinch the prongs of the fastener. The anvil in this position also supports the forward end of the housing 12 so it cannot pass through the opening 34 in the base to the tacking position.

In Figs. 8 and 9 is shown still another means for mounting the anvil. The anvil 48 has extensions 49 forming pintles hinged to the top wall of the base 11. This part of the hinge may be made in different ways but as shown the top wall of the base is cut and a portion of the wall is forced upwardly to form a loop 50 to receive the pintle extension 49 and hinge the anvil to the base. In the position of Fig. 8 the anvil lies over the forward end portion of the opening 34 in the base with the recesses 23 in alignment with the fastener driving means in the housing 12 to cooperate therewith to clinch the prongs of the fastener as it is being driven and also to support the forward end of the housing during the fastener driving operation. By merely lifting the right hand free edge of the anvil and swinging it to the left about its hinge connection to the base it may be swung to the dotted line position removing it from its position over the opening 34 and also removing it from its position under the housing 12 so that the housing is free to move through the opening 34 to the tacking position of Fig. 3, permitting the machine to be used as a tacker.

In Fig. 10 the anvil 51 provided with clinching recesses 23 is also mounted over the forward end of the opening 34 in the base 11 but is pivoted at one end by a rivet or similar means 52 to the base so that it may be swung to and from the stapling position. When in the full line position the clinching recesses 23 are in alignment with the fastener driving mechanism in the housing 12 so as to cooperate therewith to clinch the prongs of the fastener and the anvil also prevents the housing passing through the opening 34 to the tacking position. By merely swinging the anvil to the left about the pivot 52 to the dotted line position it is removed from its position over the opening 34 in the base and also from its position under the forward end of the housing 12, so that the housing is free to move through the opening 34 to the tacking position of Fig. 3.

It will be seen from the above that the device is a very simple construction involving a minimum number of parts and that it may be by a simple operation changed from a stapler to a tacker, and vice versa. In other words, the same device may be used in the ordinary manner as a desk stapling machine for driving and clinching substantially U-shaped staples through superimposed sheets of paper or the like, and by a simple operation either of shifting the housing relative to the anvil or the anvil relative to the housing to remove the anvil from the clinching position, the housing is free to move through the opening in the base to the tacking position where it may be used to drive the fasteners, such for example as U-shaped staples, directly into the work piece without clinching. In other words, it provides a construction in which the same device and same mechanism may be used either as a so-called stapler or a so-called tacker and may be quickly and easily changed from its adaptability for one operation to the other.

Having thus set forth the nature of my invention, I claim:

1. A fastener driving machine comprising a base, a housing pivoted adjacent its rear end to the base, means at the forward end of the housing for driving a pronged fastener, an anvil on the base under said driving means including means to cooperate with the driving means to clinch the prongs of the driven fastener, said base being provided with an elongated opening of a size and shape to permit the forward end portion of the housing to pass therethrough to engagement with a work member under the base to permit driving of a fastener into said member, and the housing and anvil being so mounted that one of them may be shifted relative to the other so that the anvil is away from its position under the housing to permit the housing to pass through said opening to engage a work piece.

2. A fastener driving machine comprising a base provided with an elongated opening therein, a housing, means at one end of the housing for driving a pronged fastener, means adjacent the other end of the housing pivotally connecting the housing to the base in a manner to permit the housing to move between a fastener driving position above the base and a second position through the opening to engage a work piece under the base to drive a fastener therein, an anvil mounted on the base in position to cooperate with the driving means in the first position of the housing to clinch the prongs of a driven fastener, and the housing and anvil being so mounted that one of them may be shifted relative to the other to permit the housing to be shifted to the second driving position.

3. A fastener driving machine comprising a base provided with an opening therein, a housing mounted on the base, means in the housing for driving a pronged fastener, said housing being so mounted that it is adapted to assume a position to act as a stapler to clinch the prongs of a fastener and a second position in engagement with a work piece through the opening in the base to act as a tacker and drive a fastener into the work piece without clinching, an anvil in position to cooperate with the driving means while the housing is in the first position to clinch the prongs, and the anvil and the housing being so mounted that one of them may be shifted relative to the other so that the anvil is out of stapling position to permit the housing to move to tacking position.

4. A fastener driving machine comprising a base, a housing mounted on the base, means adjacent one end of the housing for driving a pronged fastener, said base being provided with an opening adapted to permit said latter end of the housing to pass through to engage a work piece under the base, means mounting the housing to permit it to move between a stapling position above the base and a tacking position in said opening, an anvil on the base adapted to cooperate with the driving means to clinch a fastener when the housing is in stapling position, and the housing and anvil being so mounted that one of them may be shifted relative to the other to retain the housing in stapling position or allow it to move to tacking position.

5. A fastener driving machine comprising a housing, means in the housing for driving the prongs of a fastener into a work piece, an anvil provided with means adapted to cooperate with the driving means to clinch the prongs of a fastener as they are being driven through a work piece between the housing and the anvil, and means for mounting the anvil so that it may be shifted from the clinching position to permit the housing to assume a tacking position against a work piece and allow the driving means to drive the fastener prongs into the latter work piece without clinching.

6. A fastener driving machine comprising a base provided with an elongated opening, a housing mounted on the base and movable from a stapling position over said opening to a tacking position in the opening, means in the housing for driving a pronged fastener while the housing is in either position, an anvil adapted to cooperate with the driving means to clinch the prongs of the fastener when the housing is in the stapling position, and means for mounting the anvil so that it may be shifted from the stapling position to permit the housing to move to the tacking position.

7. A fastener driving machine comprising a base provided with an elongated opening, a housing mounted on the base and movable from a stapling position over said opening to a tacking position in the opening in engagement with a workpiece under the base, means in the housing for driving a pronged fastener while the housing is in either position, an anvil mounted on the base over said opening in position to cooperate with the driving means to clinch the prongs of the fastener when the housing is in the stapling position, and means for mounting the anvil so that it may be shifted from the stapling position and permit the housing to move into the opening to the tacking position.

8. A fastener driving machine comprising a base provided with an elongated opening, a housing mounted on the base, means pivotally securing the housing to the base adjacent one end arranged to permit the housing to move from a stapling position above the base to a tacking position in the opening, means adjacent the other end of the housing for driving a pronged fastener while the housing is in either position, an anvil mounted on the base in position to cooperate with the driving means to clinch the prongs of the fastener when the housing is in the stapling position, and said pivot means including an elongated slot arranged to permit longitudinal sliding movement between the housing and base to allow the housing to be shifted away from the anvil so it may move to the tacking position in the opening.

9. A fastener driving machine comprising a base provided with an elongated opening, a housing mounted on the base and movable from a stapling position over said opening to a tacking position in the opening, means in the housing for driving a pronged fastener while the housing is in either position, an anvil adapted to cooperate with the driving means to clinch the prongs of the fastener when the housing is in the stapling position, and said anvil and housing being so mounted that one of them may be shifted relative to the other to permit the housing to move to the tacking position.

JOHN A. PAUL.